(12) United States Patent
Day

(10) Patent No.: US 8,275,925 B2
(45) Date of Patent: Sep. 25, 2012

(54) METHODS AND APPARATUS FOR IMPROVED SERIAL ADVANCED TECHNOLOGY ATTACHMENT PERFORMANCE

(75) Inventor: Brian A. Day, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 105 days.

(21) Appl. No.: 12/868,220

(22) Filed: Aug. 25, 2010

(65) Prior Publication Data

US 2012/0054403 A1   Mar. 1, 2012

(51) Int. Cl.
G06F 13/36 (2006.01)
G06F 13/28 (2006.01)

(52) U.S. Cl. ............ 710/308; 710/28; 710/74; 710/306; 710/315

(58) Field of Classification Search ............ 710/28, 710/74, 306, 308
See application file for complete search history.

(56) References Cited

U.S. PATENT DOCUMENTS

| | | | |
|---|---|---|---|
| 6,948,036 B2 * | 9/2005 | Grieff et al. | 711/151 |
| 7,523,235 B2 * | 4/2009 | Nemazie et al. | 710/74 |
| 7,539,798 B2 * | 5/2009 | Voorhees et al. | 710/74 |
| 7,739,432 B1 * | 6/2010 | Shaw et al. | 710/74 |
| 7,747,788 B2 * | 6/2010 | Chang et al. | 710/5 |
| 8,032,690 B2 * | 10/2011 | Ji et al. | 711/103 |
| 2004/0158669 A1 * | 8/2004 | Weng et al. | 711/103 |
| 2007/0136521 A1 | 6/2007 | Voorhees | |
| 2011/0320706 A1 * | 12/2011 | Nakajima | 711/114 |

OTHER PUBLICATIONS

HP—"Serial Attached SCSI ATA upper layers"; 86 pages, Dated Sep. 30, 2003.*
"Serial ATA II Specification Extensions to Serial ATA 1.0, Revision 1.070"; 100 pages, Dated Jun. 23, 2003.*
Intel—"Serial ATA II Native Command Queuing Overview"; 21 pages, Dated Apr. 2003.*
"Serial ATA: High Speed Serial AT Attachment-Revision 1.0—Chapter 8: Transport Layer", Jan. 7, 2003, XP002673801, 54 pages.

* cited by examiner

Primary Examiner — Brian Misiura
(74) Attorney, Agent, or Firm — Duft Bornsen & Fishman LLP

(57) ABSTRACT

Methods and apparatus for improved performance in communications with a SATA target device. Features and aspects hereof provide for continuing DMA transfers from a storage controller (e.g., a SATA host or a SAS/STP initiator) to a SATA target device without regard to receipt of DMA ACTIVATE Frame Information Structures (FIS). Logic to implement these features may be provided by bridge logic within an enhanced SAS expander coupled with an enhanced SAS/STP initiator or may be provided by suitable logic in an enhanced SATA host coupled directly with an enhanced SATA target device. By continuing DMA transfer of data from the initiator/host to the SATA target device without regard to receipt of a DMA ACTIVATE FIS, more of the available bandwidth of the SAS/SATA communication link may be utilized. Other standard features of the SAS/SATA protocols provide for flow control to prevent overrun of the SATA target device's buffers.

14 Claims, 4 Drawing Sheets

US 8,275,925 B2

METHODS AND APPARATUS FOR IMPROVED SERIAL ADVANCED TECHNOLOGY ATTACHMENT PERFORMANCE

BACKGROUND

1. Field of the Invention

The invention relates generally to storage system performance and more specifically relates to methods and apparatus for improving throughput in communications between an initiator/host device and a Serial Advanced Technology Attachment (SATA) target device.

2. Discussion of Related Art

In storage systems, a host system communicates with one or more storage devices. In SATA storage systems, an initiator/host device (e.g., a host system) communicates with a SATA target device (e.g., a SATA storage device such as a disk drive). The SATA protocol evolved as a high speed, low cost alternative to Parallel Advanced Technology Attachment (PATA) coupling between an initiator and a target. In PATA, there existed a need to coordinate the operation of direct memory access (DMA) high speed transfers from the host to the disk so that the host (initiator) would not overrun the capability of the target (disk) to receive data. The PATA disk drive typically had a limited buffer memory for receiving high-speed data under DMA control from the host. To coordinate these transfers PATA standards included a handshake protocol whereby the disk drive would signal the host that it was capable of receiving a DMA transfer of data up to a maximum buffer size (a "DMA SETUP" message was sent from the PATA disk drive to the host). Next, the disk would send a "DMA ACTIVATE" signal to the host indicating it was now ready for a DMA transfer up to the maximum buffer size specified in the DMA SETUP signal. The host would then perform that DMA transfer and await a next signal (a next DMA ACTIVATE) from the disk drive indicating that it was again ready for another DMA transfer. This handshake continued until the entire transfer from the disk was completed.

As SATA was introduced, the SATA standards included the same DMA SETUP and DMA ACTIVATE messages transmitted from the SATA target device (e.g., disk drive) to the initiator device (e.g., host system). These messages are transmitted as Frame Information Structures (FIS) in the SATA protocol and are discussed in the Native Command Queuing (NCQ) aspects of the SATA standards. The SATA standards are well known to those of ordinary skill in the art and are generally available at www.serialata.org. SATA protocols may also be used in a Serial Attached SCSI (SAS) domain through use of the SATA Tunneling Protocol (STP) in a SAS initiator (i.e., a SAS/STP initiator). SAS and STP specifications are well known to those of ordinary skill in the art and are generally available at www.t10.org.

The SATA protocol standardizes the maximum DMA transfer associated with each DMA ACTIVATE message as 8 kilobytes. This DMA related handshake mechanism throttles the performance of the initiator/host in that each DMA transfer of 8 KB is delayed awaiting receipt of the next DMA ACTIVATE. In addition, the initiator device may be required to perform administerial setup and configuration of a DMA transfer multiple times to start and stop the DMA circuits for a next 8 KB transfer by the initiator device in response to receipt of each DMA ACTIVATE message. This additional overhead processing in the initiator/host reduces the overall performance of a SATA storage system.

Many present SATA target devices, including rotating disk drives, are capable of receiving far more than 8 KB at the full rated speed of the SATA communication link (e.g., 3 GB/sec or approximately 300 MB/sec). Still further, SATA semiconductor storage devices (e.g., RAMdisks or flash drives) may be capable of receiving data continuously at the rated speed of the SATA communication link. Thus, the overhead processing of awaiting receipt of a DMA ACTIVATE and any associated re-configuring of the DMA circuits of the initiator may impose a severe performance penalty on the SATA storage system.

Thus, it is an ongoing challenge to improve performance of a SATA storage system.

SUMMARY

The present invention solves the above and other problems, thereby advancing the state of the useful arts, by providing methods and apparatus for enhanced performance in communications with a SATA target device. Features and aspects hereof provide for altering a SATA controller to disregard (e.g., discard) DMA ACTIVATE FISs such that the controller may continuously transfer data to the SATA target. In one exemplary embodiment, the controller comprises a modified SAS/STP initiator coupled with an enhanced SAS expander such that the expander discards DMA ACTIVATE FISs and the initiator does not require them to continue data transfers to the SATA target device through the expander. In another exemplary embodiment, a native SATA host is enhanced to not require receipt of DMA ACTIVATE FISs and the SATA target device is enhanced to not send DMA ACTIVATE FISs. In such exemplary embodiments, the initiator need not await receipt of a DMA ACTIVATE to continue data transfer but rather relies on other standard SATA protocol flow control methods to assure that receive buffers of the SATA target device are not overflowed.

In one aspect hereof, a method is provided for transferring data between a SAS initiator and a SATA target device through a SAS expander. The method comprises receiving a DMA SETUP FIS in the SAS initiator from the SATA target device and transmitting data from the SAS initiator to the SATA target device in response to receipt of the DMA SETUP FIS. The step of transmitting does not await receipt in the SAS initiator of a DMA ACTIVATE FIS from the SATA target device during or following the step of transmitting.

Another aspect hereof provides a method operable in a system comprising a native SATA host coupled with a SATA target device. The method for transferring data between the SATA host and the SATA target device. The method comprises receiving a DMA SETUP Frame Information Structure (FIS) in the SATA host from the SATA target device and transmitting data to the SATA target device in response to receipt of the DMA SETUP FIS. The SATA host does not await receipt of a DMA ACTIVATE FIS to complete the step of transmitting. The SATA target device does not transmit a DMA ACTIVATE FIS to complete the step of transmitting.

Yet another aspect hereof provides a method operable in a SATA storage system. The storage system comprising a storage controller and a SATA target device. The method comprises transmitting a Register FIS comprising a command (COMMAND FIS) from the storage controller to the SATA target device. The COMMAND FIS is associated with data to be transmitted to the SATA target device. The method also comprises receiving in the storage controller a DMA SETUP FIS from the SATA target device in response to transmission of the COMMAND FIS and determining whether the DMA SETUP FIS includes an indicator requesting AUTO-ACTIVATE. Responsive to a determination that the DMA SETUP FIS does not include an AUTO-ACTIVATE indicator, the method also comprises awaiting receipt of a first DMA ACTIVATE FIS from the SATA target device. Responsive to receipt of the first DMA ACTIVATE FIS and/or responsive to a determination that the DMA SETUP FIS includes an AUTO-ACTIVATE indicator, the method further comprises transmitting a DATA FIS from the storage controller to the SATA target device using a DMA circuit of the storage controller wherein the DATA FIS comprises a portion of the data associated with the COMMAND FIS. The step of transmitting the DATA FIS further comprises detecting receipt of a DMA ACTIVATE FIS from the SATA target device and discarding the DMA ACTIVATE FIS responsive to detection of receipt of the DMA ACTIVATE FIS. The step of transmitting a DATA FIS is repeated until all data associated with the COMMAND FIS is transmitted to the SATA target device.

Another aspect hereof provides SAS expander comprising a first interface adapted to couple the expander with a SAS/STP initiator and a second interface adapted to couple the expander with a SATA target device. The expander also comprises bridge logic adapted to transfer data received from the SAS/STP initiator through the first interface to the SATA target device through the second interface. The data is associated with a COMMAND FIS. The bridge logic is further adapted to discard any DMA ACTIVATE FIS received from the SATA target device through the second interface until transfer of the data associated with the COMMAND FIS is completed.

Still another aspect hereof provides a storage system comprising a Serial Advanced Technology Attachment (SATA) host and a SATA storage device coupled with the SATA host. The SATA host is adapted to transfer data to the storage device without requiring a DMA ACTIVATE Frame Information Structure (FIS) after transmission of each of a plurality of DATA FISs.

DETAILED DESCRIPTION OF THE DRAWINGS

Figure 1:
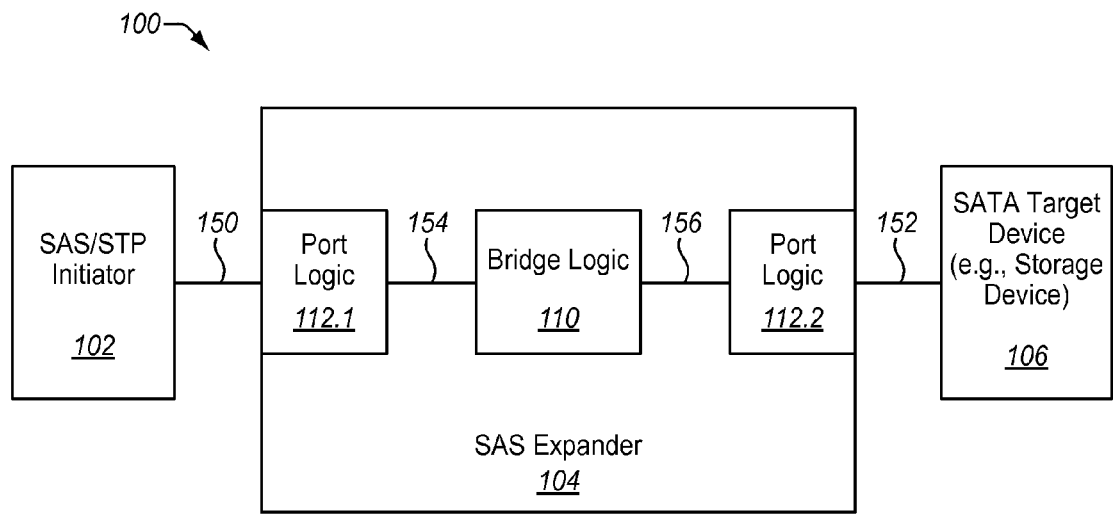
FIG. 1 is a block diagram of an exemplary system providing enhanced performance in communication with a SATA target device in accordance with features and aspects hereof.

FIG. 1 is a block diagram of a system 100 enhanced in accordance with features and aspects hereof to improve performance of the system in communications with a SATA target device. System 100 includes a SATA target device 106 coupled with a storage controller for exchanging data with SATA target device 106. SATA target device 106 may be any suitable storage device such as SATA disk drives (e.g., a rotating magnetic or optical disk drive as well as semiconductor storage devices such as RAM disks and flash drives). In the exemplary embodiment of FIG. 1, the storage controller comprises an enhanced SAS/STP initiator 102 serving as a host device coupled with enhanced SAS expander 104. SAS expander 104 may be coupled with the initiator 102 via communication path 150 through port logic 112.1. Communication path 150 may comprise any suitable SAS communication medium. Port logic 112.1 comprises standard logic in accordance with the SATA protocols for implementing PHY layer, link layer, and/or other logic layers within SATA expander 104 for implementing one logical port (i.e., a narrow or wide SAS port). In like manner, SAS expander 104 may be coupled with SATA target device 106 by a communication path 152 and port logic 112.2. Communication path 152 may comprise any suitable SAS communication medium. Port logic 112.2 may comprise any standard logic in accordance with SATA protocols for implementing PHY layer, link layer, and/or other logic layers within SAS expander 104 for exchanges with SATA target device 106. Initiator 102 may be any suitable control logic for implementing the SAS/STP protocol within a SAS compliant device including, for example, a host bus adapter (HBA) or a storage controller integral within a storage subsystem.

SAS expander 104 further comprises well-known, standard components (not shown) such as crossbar switching logic and other suitable logic common in a fully functional, standard, SAS expander. In addition, SAS expander 104 comprises bridge logic 110 coupled with port logic 112.1 and 112.2 via paths 154 and 156, respectively. Bridge logic 110 provides enhanced logic in accordance with features and aspects hereof to improve performance of system 100. In particular, bridge logic 110 serves to discard DMA ACTIVATE FISs received from the SATA target device 106. In conjunction with bridge logic 110, initiator 102 is enhanced such that it does not require receipt of DMA ACTIVATE FISs as specified by the SATA standards. By eliminating the need to await receipt of multiple DMA ACTIVATE FISs, initiator 102 may, more efficiently, continuously transfer data through communication path 150 destined for SATA target device 106 through SAS expander 104 via path 152. Other standard flow control mechanisms of the SAS/SATA protocols are utilized to assure proper flow control between initiator 102 and SATA target device 106 to prevent overflow of receive buffers within SATA target device 106.

Figure 2:
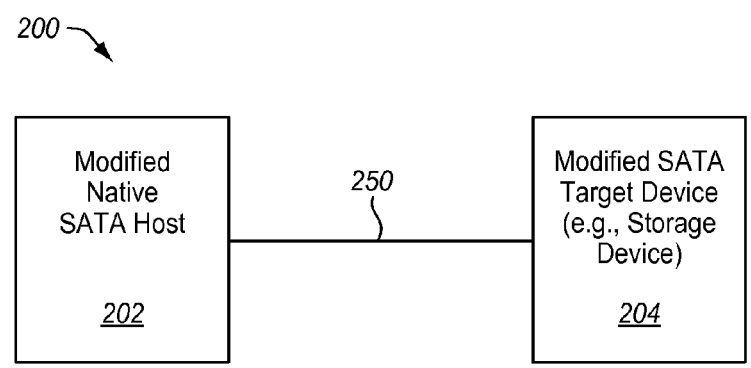
FIG. 2 is a block diagram of another exemplary system providing enhanced performance in communication with a SATA target device in accordance with features and aspects hereof.

FIG. 2 is a block diagram of an alternative embodiment as system 200 in which a modified native SATA host 202 is coupled directly to a modified SATA target device 204 via SATA communication path 250. Modified native SATA host 202 is enhanced to optionally not require DMA ACTIVATE FISs be received from the modified SATA target device 204 and modified SATA target device is enhanced to optionally not transmit DMA ACTIVATE FISs. Thus, system 200 provides enhanced performance as compared to standard SATA systems that are fully compliant with present SATA specifications to await, within the SATA host, receipt of DMA ACTIVATE FISs from the SATA target device 204 after transmission of each DATA FIS. As noted, the enhanced features may be optional in that the enhanced SATA host 202 may determine whether or not a SATA target coupled to it is enhanced as is modified target device 204. In like manner, enhanced target device 204 may be operable in compliance with present SATA standards to transmit DMA ACTIVATE FISs unless and until an enhanced SATA host 202 configures it for enhanced operations.

Those of ordinary skill in the art will readily recognize numerous additional and equivalent elements and modules within fully functional systems 100 and 200 of FIGS. 1 and 2, respectively. Such additional and equivalent elements are omitted herein for simplicity and brevity of this discussion.

Figure 3:
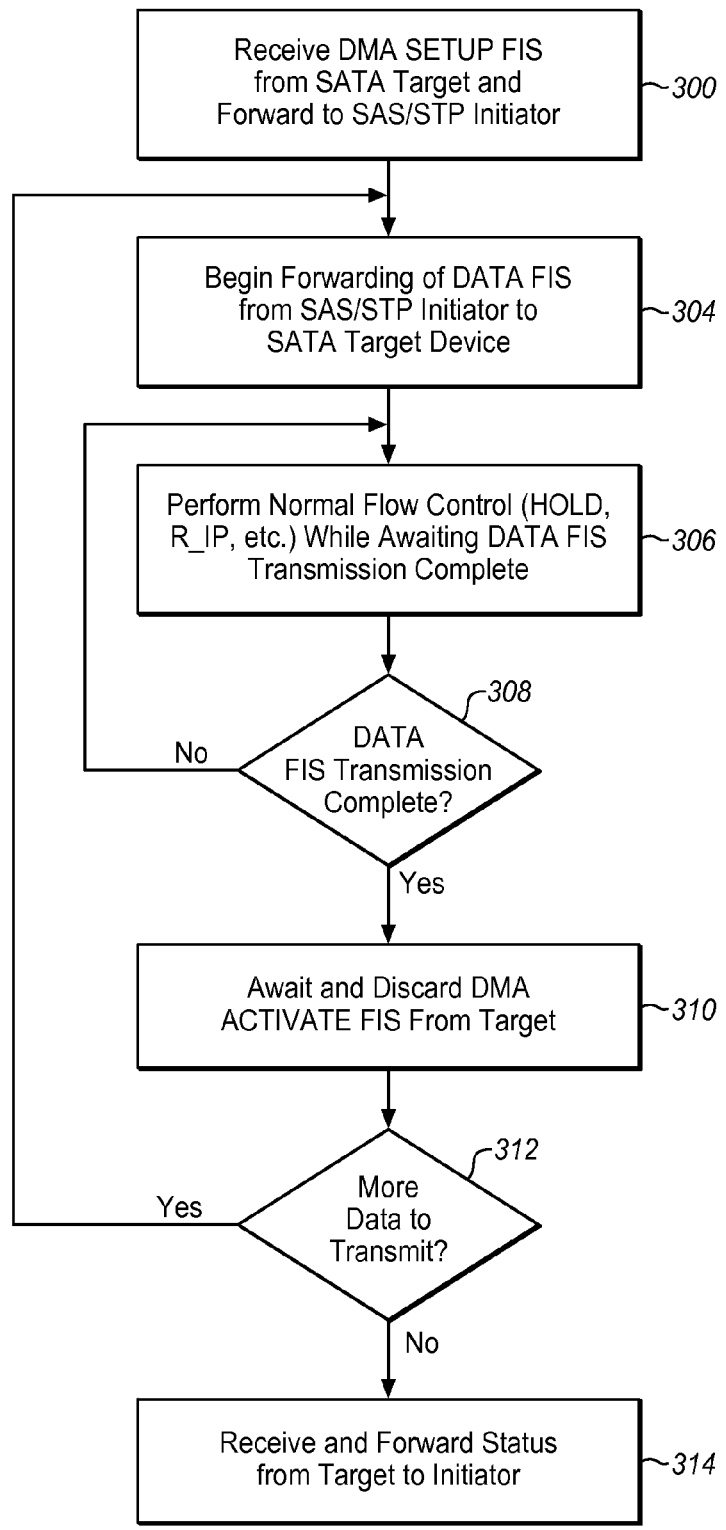
FIGS. 3, 4, and 5 are flowcharts describing exemplary methods enhanced performance in communication with a SATA target device in accordance with features and aspects hereof.

FIG. 3 is a flowchart describing an exemplary method for improved storage system performance in accordance with features and aspects hereof. The method of FIG. 3 may be operable in an enhanced SAS expander such as described in system 100 of FIG. 1. The method of FIG. 3 is operable in response to a requirement to send data from the SAS/STP initiator to a SATA target device through an intermediate (enhanced) SAS expander.

Following initial transmission of an appropriate SATA Register FIS comprising a command (COMMAND FIS) to indicate transmission of data to the SATA target, step 300 receives a DMA SETUP FIS from the SATA target device. The received DMA SETUP FIS is forwarded from the expander to the initiator. At step 304, the transmission of a first/next DATA FIS is commenced. The DATA FIS received from the initiator is forwarded by the enhanced SAS expander to the SATA target device. As data transmission proceeds, step 306 performs normal flow control operations in accordance with the SATA standards until step 308 determines that the DATA FIS transmission has been completed. When the current DATA FIS is completely forwarded to the SATA target (from the initiator through the SAS expander), step 310 awaits receipt of a DMA ACTIVATE FIS from the SATA target and discards the received DMA ACTIVATE FIS. In accordance with features and aspects hereof, all DMA ACTIVATE FISs may be discarded. Step 312 next determines whether more data associated with the initial COMMAND FIS is yet to be transmitted. If so, processing continues looping back to step 304 to configure for, and commence the transmission of a next DATA FIS transmitting additional data associated with the underlying COMMAND FIS. If step 312 determines that no further data associated with the COMMAND FIS needs to be transmitted, step 314 receives status indicia from the target device and forwards the status to the initiator to thereby complete transmission of the COMMAND FIS and its associated data to the SATA target device.

The method of FIG. 3 therefore improves performance of communication with the SATA target device by eliminating the need within the initiator to await receipt of a DMA ACTIVATE FIS after each 8 kilobytes of data transmission as specified by the SATA standards. Other well-known flow control mechanisms of the SAS and SATA protocols (as noted in step 306) are utilized to assure proper flow control to avoid overflow of receive buffers within the SATA target device. Those of ordinary skill in the art will readily recognize numerous additional and equivalent steps in a fully functional method to transmit data from an initiator to a SATA target device. Such additional and equivalent steps may include, for example, error recovery and retry and other features. Such additional and equivalent steps are omitted herein for simplicity and brevity of this discussion.

Figure 4:
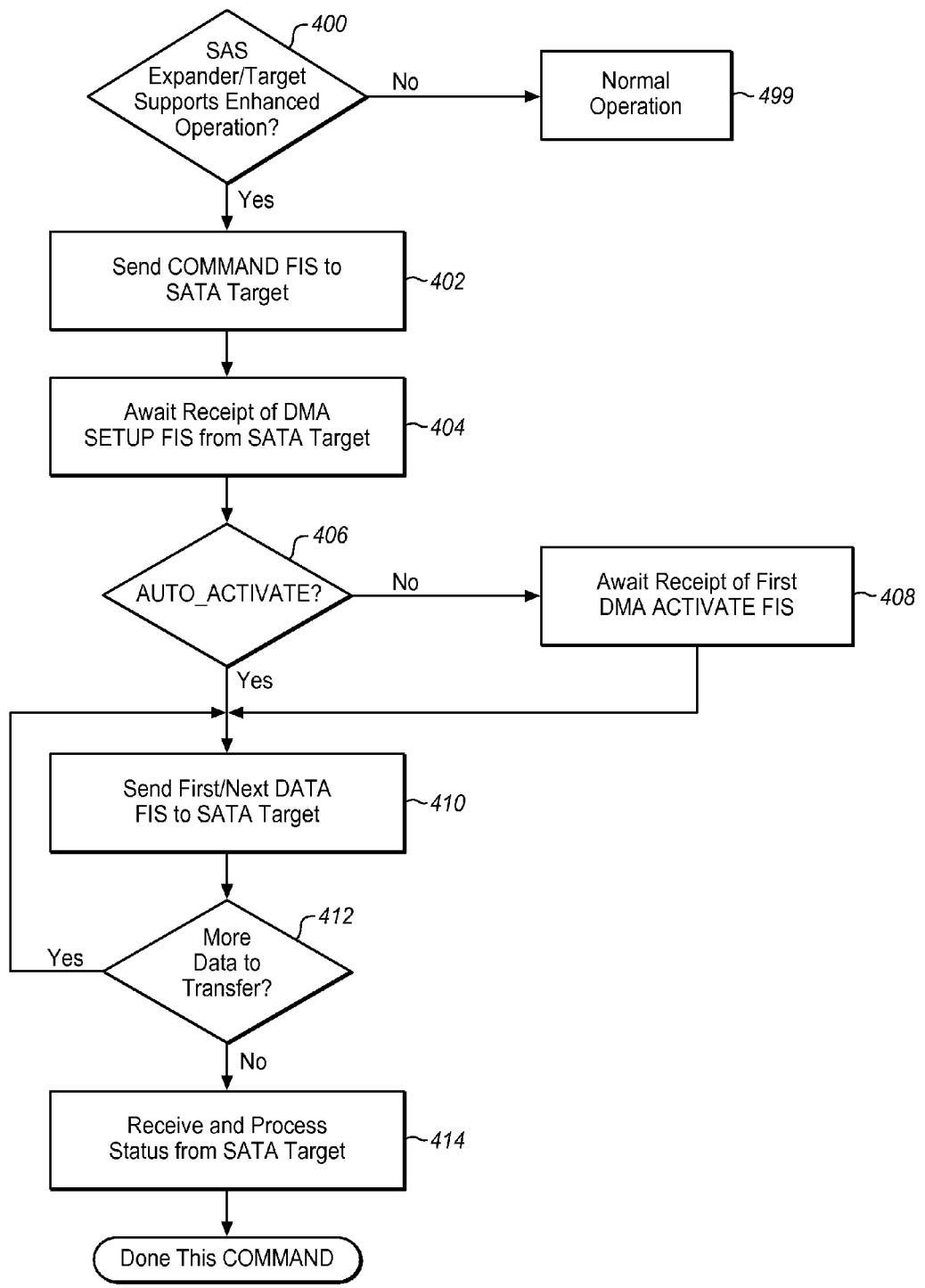

FIG. 4 is a flowchart describing another exemplary method in accordance with features and aspects hereof to improve performance in communications between a SAS/STP initiator and a SATA target device through an enhanced SAS expander. The method of FIG. 4 may be operable, for example, in system 100 of FIG. 1. More specifically, the method of FIG. 4 may be operable in the enhanced SAS/STP initiator of FIG. 1. Further, the method of FIG. 4 may be operable in an enhanced native SATA host coupled with an enhanced SATA storage device such as that depicted in FIG. 2.

Step 400 first determines (e.g., within the SAS/STP initiator) whether the SAS expander includes enhanced features and aspects hereof to improve SATA target device communication performance. The test of step 400 may be achieved by querying the SAS expander to determine from vendor unique information or other configuration information whether the SAS expander supports the enhanced operation. If not, step 499 represents normal operation of the initiator and expander in accordance with SATA specifications (e.g., all standard delays associated with awaiting DMA ACTIVATE FISs). Those of ordinary skill in the art will readily recognize that the query or test performed by step 400 may be performed once during initialization of the initiator and need not be performed in association with each desired transmission to the SATA target device. Further, as discussed below, the processing of step 400 may also be utilized within an enhanced native SATA host to test whether a directly coupled SATA target device is enhanced to obviate the transmission of DMA ACTIVATE FISs.

If the SAS expander (or SATA target) is appropriately enhanced, the SAS/STP initiator continues at step 402 sending a COMMAND FIS to the SATA target device (through the enhanced SAS expander or directly) indicating the need to transfer data from the initiator to the SATA target device. Following transmission of the COMMAND FIS, step 404 awaits receipt of a DMA SETUP FIS from the SATA target device. In accordance with SATA specifications, the DMA SETUP FIS provides a number of parameters used by the initiator to configure its DMA circuits for transferring data to the SATA target device. At step 406, the initiator determines whether the parameters of the DMA SETUP indicate an AUTO-ACTIVATE feature is to be utilized. The AUTO-ACTIVATE feature, in accordance with SATA standards, indicates that the initiator need not await receipt of a first DMA ACTIVATE FIS but rather may immediately commence transmission of a first DATA FIS. If step 406 determines that the AUTO-ACTIVATE feature is not indicated by the DMA SETUP FIS, step 408 awaits receipt of a first DMA ACTIVATE FIS from the target device. Upon receipt of the first DMA ACTIVATE FIS at step 408 or in response to a determination at step 406 that the AUTO-ACTIVATE feature is set in the DMA SETUP, step 410 transmits the next (e.g., first) DATA FIS to the SATA target device utilizing DMA circuits or other data transfer capabilities of the SAS/STP initiator. Further exemplary details of the operation of step 410 are provided herein below with reference to FIG. 5.

Step 412 then determines whether additional data associated with the transmitted COMMAND FIS remains to be transferred to the SATA target device. If so, processing continues looping back to step 410 to configure and transmit a next DATA FIS to the target device. Otherwise, step 414 receives and processes status information from the SATA target device to thereby complete transfer of the underlying command and its associated data.

As further detailed herein below, step 410 does not require waiting for any DMA ACTIVATE FIS to commence and complete transmission of a DATA FIS. Rather, the enhanced initiator may continuously send DATA FISs and continue operation of its DMA circuits. Standard flow control mechanisms of the SAS and SATA protocols are utilized assuring proper flow control to avoid overflow of receive buffers within the SATA target device.

Figure 5:
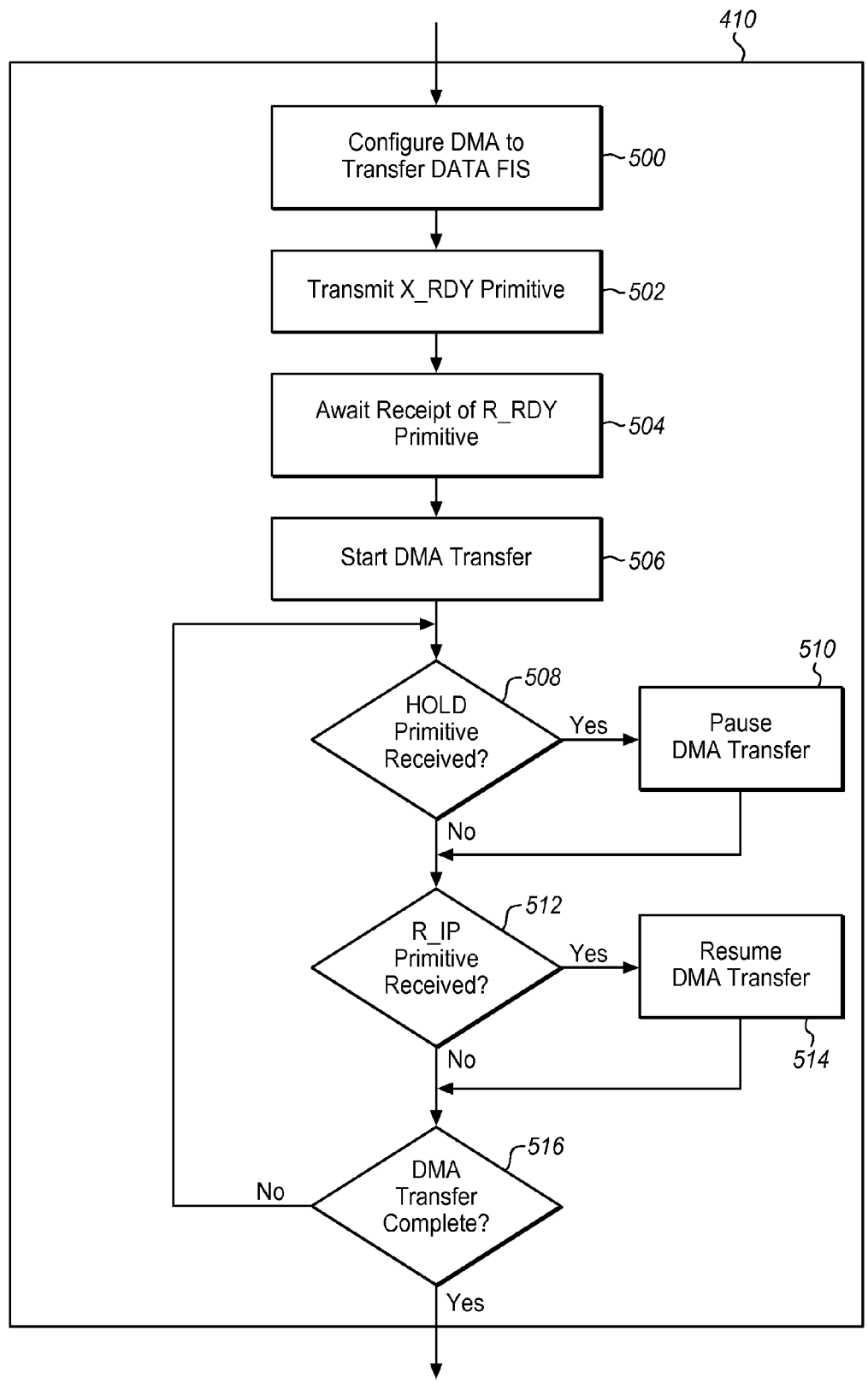

FIG. 5 is a flowchart depicting exemplary additional details of the processing of step 410 of FIG. 4 to transmit a single DATA FIS representing a portion of the data associated with an underlying COMMAND FIS. Step 500 configures a DMA circuit of the initiator to transfer the next DATA FIS through the enhanced SAS expander to the SATA target device (or directly from the enhanced SATA host to an enhanced SATA target device). In accordance with SATA standards, step 502 then transmits an X_RDY primitive to the SATA target device to indicate that the initiator is ready to transmit data. Step 504 then awaits receipt of an R_RDY primitive from the SATA target device indicating its readiness to receive the DATA FIS transmission from the initiator. Step 506 then starts a DMA transfer (or other transfer mechanism) of the DATA FIS from the initiator to the SATA target device (directly or through the enhanced SAS expander).

Steps 508 through 516 are then operable as the DMA circuit transfers the DATA FIS to the target device to assure appropriate flow control in accordance with standard SATA protocols. In particular, step 508 tests whether a HOLD primitive has been received from the SATA target device. If so, step 510 temporarily pauses the DMA circuit to stop the transfer of the DATA FIS thereby assuring that receive buffers of the SATA target device will not be overflowed. If no HOLD primitive has been received or if the DMA transfer has been paused, step 512 next detects whether an R_IP primitive has been received from the SATA target device indicating its readiness to resume receipt of the DATA FIS. If so, step 514 resumes processing by the DMA circuit to continue transferring the current DATA FIS. If no R_IP primitive is received or if the DMA transfer has been resumed, step 516 next determines whether the DMA transfer of this DATA FIS has completed. If not, processing continues looping back to step 508 to continue processing for appropriate flow control during transmission of this DATA FIS. Upon completion of the DMA transfer of this DATA FIS, processing of step 410 is completed.

Thus, the methods of FIGS. 4 and 5 improve performance in communications between an initiator and a SATA target device through an enhanced SAS expander (or directly between an enhanced SATA host and an enhanced SATA target device). Those of ordinary skill in the art will readily recognize numerous additional and equivalent steps in a fully functional method to transmit data from an initiator to a SATA target device. Such additional and equivalent steps may include, for example, error recovery and retry and other features. Such additional and equivalent steps are omitted herein for simplicity and brevity of discussion.

Further, as noted above, those of ordinary skill in the art will readily recognize that the methods of FIGS. 4 and 5 also represent methods operable in an enhanced SATA host coupled directly to an enhanced SATA target device. Step 400 of FIG. 4 may determine whether a directly connected SATA target device is enhanced to support features and aspects hereof or whether it is a "legacy" target device in compliance only with present SATA standards. If a directly coupled target device is enhanced, the method of FIGS. 4 and 5 are essentially identical regardless of whether the initiator/host is coupled directly to the enhanced SATA target device (e.g., coupled with a SATA host) or coupled to a target device through an enhanced SAS expander (e.g., coupled with a SAS/STP initiator). In other words, the enhanced initiator/host does not require receipt of a DMA ACTIVATE FIS after each DATA FIS transmission whether coupled directly to an enhanced SATA target or coupled to a target through an enhanced SAS expander.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for transferring data between a Serial Attached SCSI (SAS) initiator and a Serial Advanced Technology Attachment (SATA) target device through a SAS expander, the method comprising:
   receiving a DMA SETUP Frame Information Structure (FIS) in the SAS initiator from the SATA target device;
   transmitting multiple DATA FIS from the SAS initiator to the SATA target device in response to receipt of the DMA SETUP FIS wherein the step of transmitting does not await receipt in the SAS initiator of a DMA ACTIVATE FIS from the SATA target device each time a DATA FIS has been transmitted.

2. The method of claim 1 further comprising:
   discarding a DMA ACTIVATE FIS received from the SATA target device within the SAS expander such that the SAS initiator does not receive the DMA ACTIVATE FIS.

3. The method of claim 2 further comprising:
   querying the SAS expander from the SAS initiator to determine that the SAS expander will discard the DMA ACTIVATE FIS.

4. The method of claim 1 further comprising:
   awaiting receipt in the SAS initiator of a first DMA ACTIVATE FIS received from the SATA target device through the SAS expander following receipt of the DMA SETUP FIS;
   repeating the step of transmitting multiple DATA FIS until transmission of all data associated with an I/O request is completed; and
   discarding any subsequent DMA ACTIVATE FIS received from the SATA target device within the SAS expander following the receipt of the first DMA ACTIVATE FIS such that the SAS initiator does not receive the subsequent DMA ACTIVATE FIS.

5. A method operable in a system comprising a native Serial Advanced Technology Attachment (SATA) host coupled with a SATA target device, the method for transferring data between the SATA host and the SATA target device, the method comprising:
   receiving a DMA SETUP Frame Information Structure (FIS) in the SATA host from the SATA target device; and
   transmitting more than one DATA FIS to the SATA target device in response to receipt of the DMA SETUP FIS, wherein the SATA host does not await receipt of a DMA ACTIVATE FIS to complete the step of transmitting, and wherein the SATA target device does not transmit a DMA ACTIVATE FIS to complete the step of transmitting.

6. The method of claim 5 wherein the DMA SETUP FIS comprises an AUTO-ACTIVATE indicator,
   the method further comprising:
   determining whether the AUTO-ACTIVATE indicator indicates that AUTO-ACTIVATE is not enabled; and
   responsive to the determination that AUTO-ACTIVATE is not enabled, awaiting receipt of a first DMA ACTIVATE FIS from the SATA target device prior to the step of transmitting.

7. A method operable in a Serial Advanced Technology Attachment (SATA) storage system, the storage system comprising a storage controller and a SATA target device, the method comprising:
   transmitting a Register Frame Information Structure (FIS) comprising a command (COMMAND FIS) from the storage controller to the SATA target device wherein the COMMAND FIS is associated with data to be transmitted to the SATA target device;

receiving in the storage controller a DMA SETUP FIS from the SATA target device in response to transmission of the COMMAND FIS;

determining whether the DMA SETUP FIS includes an indicator requesting AUTO-ACTIVATE;

responsive to a determination that the DMA SETUP FIS does not include an AUTO-ACTIVATE indicator, awaiting receipt of a first DMA ACTIVATE FIS from the SATA target device;

responsive to receipt of the first DMA ACTIVATE FIS and/or responsive to a determination that the DMA SETUP FIS includes an AUTO-ACTIVATE indicator, performing the steps of:

transmitting a DATA FIS from the storage controller to the SATA target device using a direct memory access (DMA) circuit of the storage controller wherein the DATA FIS comprises a portion of the data associated with the COMMAND FIS and wherein the step of transmitting the DATA FIS further comprises:

detecting receipt of a DMA ACTIVATE FIS from the SATA target device; and discarding the DMA ACTIVATE FIS responsive to detection of receipt of the DMA ACTIVATE FIS; and repeating the step of transmitting a DATA FIS until all data associated with the COMMAND FIS is transmitted to the SATA target device.

8. The method of claim 7 wherein the storage controller is a native SATA host.

9. The method of claim 7 wherein the storage controller comprises a Serial Attached SCSI (SAS) initiator coupled with the SATA target device through a SAS expander, wherein the step of discarding further comprises:

discarding the DMA ACTIVATE FIS within the SAS expander such that the SAS initiator does not receive the DMA ACTIVATE FIS.

10. The method of claim 7 wherein the storage controller comprises a Serial Attached SCSI (SAS) initiator coupled with the SATA target device through a SAS expander, wherein the method further comprises:

querying the SAS expander from the SAS initiator to determine whether the SAS expander is enhanced to discard any subsequent DMA ACTIVATE FIS, wherein the step of discarding further comprises:

discarding the subsequent DMA ACTIVATE FIS within the SAS expander such that the SAS initiator does not receive the subsequent DMA ACTIVATE FIS responsive to a determination that the SAS expander is enhanced; and discarding the subsequent DMA ACTIVATE FIS within the SAS initiator responsive to a determination that the SAS expander is not enhanced.

11. A Serial Attached SCSI (SAS) expander comprising:

a first interface adapted to couple the expander with a Serial Attached SCSI Serial Advanced Technology Attachment Tunneling Protocol (SAS/STP) initiator;

a second interface adapted to couple the expander with a SATA target device; and bridge logic adapted to transfer data received from the SAS/STP initiator through the first interface to the SATA target device through the second interface, wherein the data is associated with a Register Frame Information Structure comprising a command (COMMAND FIS), wherein the bridge logic is further adapted to discard any DMA ACTIVATE FIS received from the SATA target device through the second interface until transfer of the data associated with the COMMAND FIS is completed.

12. The expander of claim 11 wherein the bridge logic is further adapted to transfer a DMA SETUP FIS received from the SATA target device to the SAS/STP initiator and is further adapted to determine whether the DMA SETUP FIS includes an AUTO-ACTIVATE indicator;

wherein the bridge logic is further adapted to forward a first DMA ACTIVATE FIS received following receipt of the DMA SETUP FIS to the SAS/STP initiator.

13. A storage system comprising:

a Serial Advanced Technology Attachment (SATA) host; and a SATA storage device coupled with the SATA host, wherein the SATA host is adapted to transfer data to the storage device without requiring a DMA ACTIVATE Frame Information Structure (FIS) after transmission of each of a plurality of DATA FISs.

14. The storage system of claim 13 wherein the SATA host is further adapted to query the SATA storage device to determine whether the SATA storage device is adapted to transmit a DMA ACTIVATE FIS after receiving each of the plurality of DATA FISs, and wherein the SATA host is further adapted to discard a DMA ACTIVATE FIS received from the SATA storage device.

* * * * *